(12) United States Patent
Rolff et al.

(10) Patent No.: US 8,117,886 B2
(45) Date of Patent: Feb. 21, 2012

(54) LEAK DETECTOR WITH A LEAK DETECTOR TESTING DEVICE

(75) Inventors: Norbert Rolff, Kerpen (DE); Randolf Rolff, Kerpen (DE); Sandra Seitz, Duesseldorf (DE); Werner Grosse Bley, Bonn (DE); Thomas Boehm, Koeln-Loevenich (DE); Daniel Wetzig, Cologne (DE)

(73) Assignee: Inficon GmbH (DE)

( * ) Notice: Subject to any disclaimer, the term of this patent is extended or adjusted under 35 U.S.C. 154(b) by 522 days.

(21) Appl. No.: 12/308,720

(22) PCT Filed: Jun. 1, 2007

(86) PCT No.: PCT/EP2007/055412
§ 371 (c)(1),
(2), (4) Date: Dec. 22, 2008

(87) PCT Pub. No.: WO2007/147717
PCT Pub. Date: Dec. 27, 2007

(65) Prior Publication Data
US 2009/0188302 A1    Jul. 30, 2009

(30) Foreign Application Priority Data
Jun. 23, 2006   (DE) .......................... 10 2006 028 778

(51) Int. Cl.
*G12B 13/00* (2006.01)
*G01M 3/04* (2006.01)

(52) U.S. Cl. ............ 73/1.02; 73/1.03; 73/40; 73/40.5 R; 73/40.7

(58) Field of Classification Search ................... 73/1.02, 73/1.03, 40–49.8
See application file for complete search history.

(56) References Cited

U.S. PATENT DOCUMENTS

| 2,947,166 | A | * | 8/1960 | Palmer et al. | ................. 73/40.7 |
| 3,516,278 | A | * | 6/1970 | Klein et al. | .................... 73/1.05 |
| 3,786,675 | A | * | 1/1974 | Delatorre et al. | ............ 73/25.03 |
| 4,016,743 | A | * | 4/1977 | Henderson et al. | ............ 73/1.04 |
| 4,625,543 | A | * | 12/1986 | Ertl et al. | ....................... 73/1.02 |

(Continued)

FOREIGN PATENT DOCUMENTS
DE        10308687        4/2004
(Continued)

OTHER PUBLICATIONS

Walt Kester, "Practical Design Techniques for Sensor Signal Conditioning", 1999, Analog Devices, Inc., sections 1 and 7.*

(Continued)

*Primary Examiner* — David Rogers
(74) *Attorney, Agent, or Firm* — Ohlandt, Greeley, Ruggiero & Perle, LLP

(57) ABSTRACT

A leak detector comprising a base appliance provided with a gas detector, a vacuum pump, and a control device. A sniffer probe is connected to the base appliance. A test leak device containing the supply of test gas is arranged in a separate sub-housing. The sub-housing also contains a temperature sensor, a processor, and a data memory. The processor corrects the measured temperature according to a sample, and modulates the light of a light barrier. The processor is connected to the control device in the base appliance by a data cable.

13 Claims, 4 Drawing Sheets

U.S. PATENT DOCUMENTS

| | | | | |
|---|---|---|---|---|
| 5,375,456 A * | 12/1994 | Burns | | 73/40.7 |
| 5,386,717 A * | 2/1995 | Toda | | 73/40.7 |
| 5,767,391 A * | 6/1998 | Wong | | 73/40.7 |
| 5,889,199 A * | 3/1999 | Wong et al. | | 73/40 |
| 7,107,821 B2 * | 9/2006 | Bohm et al. | | 73/40.7 |
| 7,168,287 B2 * | 1/2007 | Rolff | | 73/1.05 |
| 7,444,854 B2 * | 11/2008 | Bohm et al. | | 73/40.7 |
| 7,779,675 B2 * | 8/2010 | Wetzig et al. | | 73/40.7 |
| 2004/0139787 A1 * | 7/2004 | Bohm et al. | | 73/40 |
| 2006/0020476 A1 * | 1/2006 | Cooper et al. | | 705/1 |
| 2006/0150707 A1 * | 7/2006 | Rolff | | 73/1.05 |
| 2008/0276692 A1 * | 11/2008 | Wetzig et al. | | 73/40.7 |

FOREIGN PATENT DOCUMENTS

| | | |
|---|---|---|
| DE | 20 2005 011 372 U1 | 1/2007 |
| JP | 06102134 | 4/1994 |
| WO | WO 02/084246 A2 | 10/2002 |
| WO | WO 2004/003408 * | 4/2004 |

OTHER PUBLICATIONS

International Search Report dated Sep. 19, 2007 from PCT/EP2007/055412.

* cited by examiner

LEAK DETECTOR WITH A LEAK DETECTOR TESTING DEVICE

BACKGROUND

1. Field of the Disclosure

The disclosure refers to a leak detector with a base appliance comprising a vacuum pump, a test gas detector and a control device, a sniffer probe connected with a housing of the base appliance through a hose, and a sub-housing containing a test leak device by which a supply of test gas is discharged in a controlled manner into a plug-in channel for the sniffer probe.

2. Discussion of the Background Art

Test gas leak detectors are used in detecting leaks in containers, conduits and other test items. A cavity of the test item is filled with a test gas, and the leak detector is used to determine the presence of test gas in the ambient air outside the test item. Helium often is the test gas of choice. The leak detector includes a test gas detector adapted to selectively determine the presence of the test gas. Moreover, it is intended to obtain information about the rate at which the test gas leaks from the leak found, or the size of the leak, respectively. For this purpose, the leak detector must be calibrated frequently. This is achieved with the use of a test leak. A test leak has a hole or a constriction with a known leakage value, the test leak being connected with a supply of pressurized test gas. For a calibration of a leak detector with a sniffer probe, the sniffer probe is moved into the proximity of the test leak, so that the leak indication can be adjusted.

In a leak detector described in WO 02/084246 A2, the test leak device is arranged in the housing of the base appliance below the base components, cooling air flowing through the housing from the bottom to the top.

DE 103 08 687 A1 describes a leak detector comprising a stationary base appliance and a test leak device provided in a sub-housing. The test leak device is connected with the main housing of the base appliance via a wire or a wireless radio link. It comprises a sub-housing in which a test gas supply is held in a test gas container. A data memory and a temperature sensor are attached to the sub-housing. The sub-housing has a plug-in channel for the insertion of a sniffer probe of the leak detector. Further, the sub-housing contains a membrane with a defined constriction through which the test gas escaping from the test gas supply flows at a controlled rate. The gas flows into a plug-in channel into which the sniffer probe is inserted. Thus, the sniffer probe draws the escaping test gas. Since the leakage rate is known, the leak detector can be calibrated. A light barrier extends across the plug-in channel of the pressure vessel. The light barrier forms a sensor for detecting the presence of the sniffer probe in the plug-in channel.

It is an object of the present disclosure to provide a leak detector, in which the test leak device is contained in a sub-housing so that the data communication and the accuracy of calibration are improved.

SUMMARY OF THE DISCLOSURE

As such, the sub-housing includes a processor processing at least one parameter of the test leak device and being in data communication with the control device provided in the housing of the base appliance.

According to the disclosure, the test leak device is provided with a processor of its own, so as to reduce the number of connection lines to the base appliance and to enhance the properties of the sensors in the sub-housing. The processor processes the incoming data and performs a correction on the data, if need be. Preferably, the processor also causes a modulation of the light barrier signal, so that it becomes possible to separate the light barrier signal from noise signals. Thereby, the influence of interfering other light sources and the influence of the light being damped by dirt can be reduced substantially. Further, the signal is filtered, whereby an additional improvement of the signal reliability is obtained.

The test leak flow is highly temperature-dependent. For an exact determination of the temperature, a zero correction and an amplification correction of the signal of a temperature sensor should be performed. The values required may be stored in a data memory that could also be housed in the test leak device. The accuracy of the temperature measurement is enhanced and the effects of production spread are reduced.

The data memory may also store data on the properties of the test gas supply. These include data on the type of gas, the temperature dependence and/or the ageing of the test gas. Here, "ageing" means the pressure loss of the test gas for leaks that do not operate at saturation vapor pressure. Taking the ageing into account becomes possible by additionally storing the filling date and the leakage rate.

In a preferred development of the disclosure, the plug-in channel includes a tube sealed from the outside against the environment of the test gas supply. The tube defines the circumferentially closed plug-in channel and forms the only way for the test gas to escape. This increases the outlet accuracy of the leakage flow coming from the test leak device, since no side flow paths are formed. Moreover, this impedes the intrusion of dirt into the test leak device, be it by the settlement of dust or by dirt introduced along with the sniffer probe.

A development of the disclosure provides that the sub-housing is removably contained in a receptacle of the base appliance housing, which receptacle is open to the outside, the test leak device being functional both in the removed state and in the inserted state.

The test leak device can thus be used optionally in the inserted state or in the removed state. In the inserted state, there is an advantage that the user only has to transport and handle a single appliance, i.e. the base appliance. The removed state offers the advantage that the test leak can be moved to a position favourable for the user, regardless of the position the stationary base appliance is in. Thus, the sub-housing is mobile with respect to the housing of the base appliance, yet it can be fastened to the housing of the base appliance such that the stand-alone mobility is given up. The test leak device forms a unit removable from the base appliance, comprising interface wires or a radio link as a bidirectional data channel for data communication with the base appliance.

According to another embodiment of the disclosure, it is provided that the plug-in channel has a radiation barrier with a radiation emitter and a radiation receiver, which are situated on different sides of the plug-in channel, and that the tube is made of material permeable to radiation. Preferably, the radiation barrier is a light barrier and the tube is transparent. The tube may be made of glass or plastic material. It receives the sniffer probe in the longitudinal direction and is light-transmissive in the transverse direction. On the one hand, the transparent tube avoids the deposition of accretions in the region of the light beam and, furthermore, it prevents test gas to enter into the appliance or the housing of the test leak device. The test gas can thus only prevail in the area intended for that purpose and can not expand inside the appliance in the area of the electronics.

BRIEF DESCRIPTION OF THE DRAWINGS

The following is a detailed description of an embodiment of the disclosure with reference to the drawing.
In the Figures.

DETAILED DESCRIPTION OF THE PREFERRED EMBODIMENT

Figure 1:
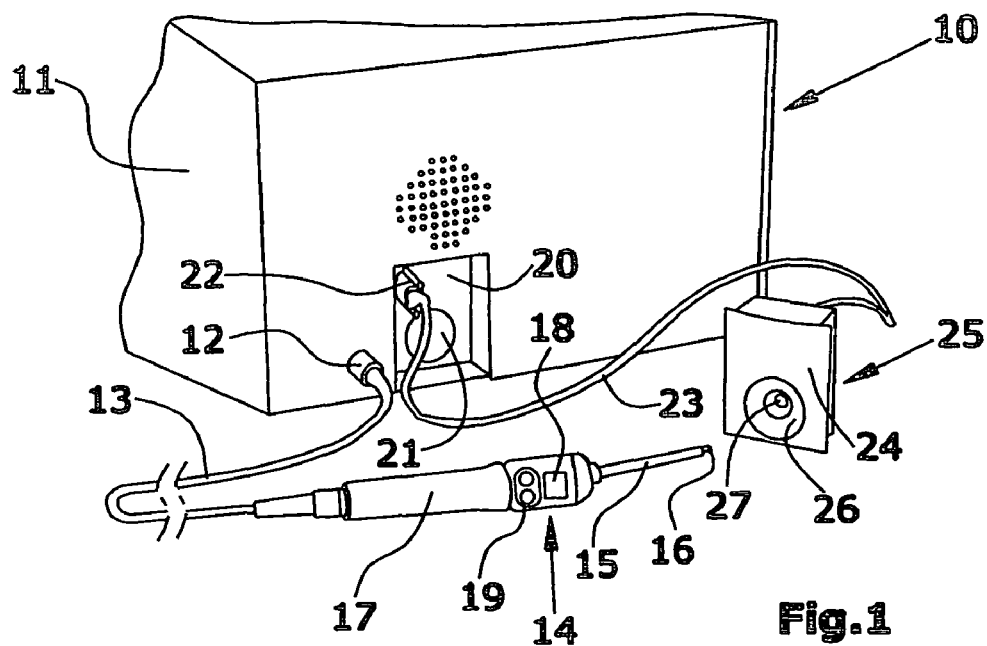
FIG. 1 is a general view of the leak detector with the base appliance and the test leak device.
Figure 2:
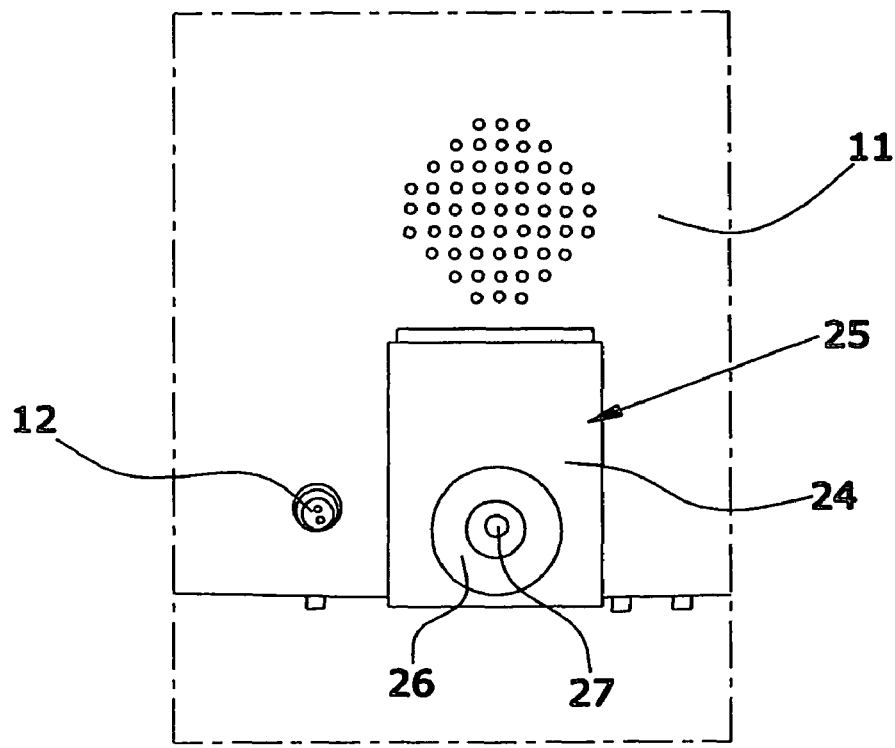
FIG. 2 is a partial front view of the base appliance with the test leak device inserted.

Referring now to FIG. 1, the leak detector comprises a base appliance 10 with a housing 11. The base appliance 10 includes all components necessary for leak detection and test gas detection, such as a vacuum pump, a test gas detector and a control device, as well as the required auxiliary aggregates. These are described in detail in WO 02/084246 A2 and in DE 103 08 687 A1.

As illustrated in FIG. 1, the housing 11 has a plug socket 12 for the line 13 of a sniffer probe 14. The mobile sniffer probe 14 is provided with a rod-shaped sniffer tip 15 having a suction opening 16 at its end. The sniffer probe 14 further comprises a handle 17, a display 18 as well as control keys 19. A hose lumen also extends through the line 13, which lumen connects the suction opening 16 with the suction source present in the housing 11.

Further, the front face of the housing 11 is provided with a receptacle 20. This may be an indentation or a recess open to the front. In the recess 20, a tunnel 21 and a plug-in device 22 are provided. The plug-in device 22 serves for inserting a data wire 23 whose other end is connected with the sub-housing 24 of the test leak device 25. The sub-housing 24 fits into the receptacle 20. It may be used alternatively at the base appliance or as a mobile element. The sub-housing 24 has a centering trough 26 in its front wall, the front end of the plug-in channel 27 being situated at the bottom of the trough. The plug-in channel serves for the insertion of the sniffer tip 15 of the sniffer probe 14.

Figure 3:
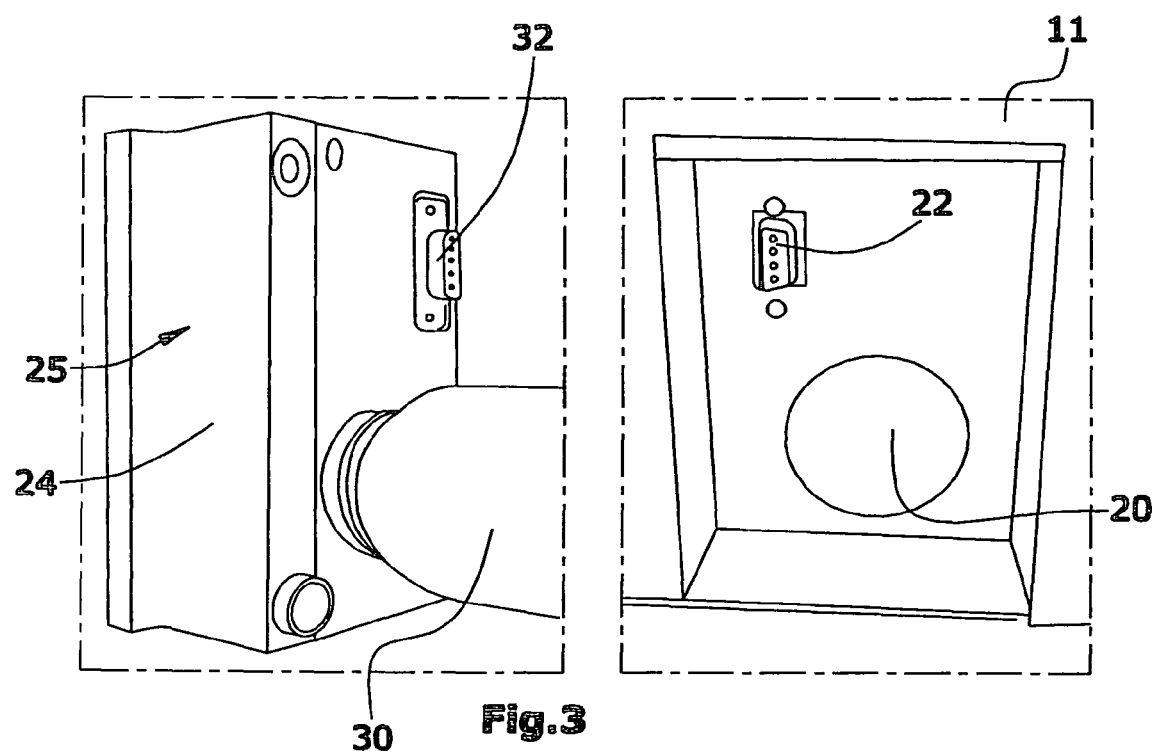
FIG. 3 is a perspective view of the rear side of the sub-housing and the receptacle of the housing of the base appliance with both connectors that are interlockable, and
FIG. 4 a schematic longitudinal section through the sub-housing with a cartridge attached thereto, the sub-housing being removed from the housing of the base appliance.

FIG. 3 illustrates the rear side of the sub-housing 24. A cartridge 30 projects rearward from the rear wall in a cantilevered manner, the cartridge being attached to the sub-housing 24 in a sealed manner. The cartridge 30 receives the test gas supply 46 contained in a replaceable test gas container 47. Further, the rear wall of the sub-housing 24 is provided with a plug-in device 32 that mates with the plug-in device 22 of the housing 11. Both plug-in devices 22, 32 are multipolar and are intended for the data communication between the test leak device 25 and the base appliance 10. As an alternative to the direct coupling of the plug-in devices 22 and 32, these may be connected via a data cable 23, as illustrated in FIG. 1.

The base appliance 10 and the test leak device 25, respectively, comprise a serial interface, e.g. a standard interface RS232. Thus, a low number of wires is obtained for the data cable 23. In the simplest case, besides two wires for the supply voltage to the test leak device, an outgoing wire and return wire are necessary for data communication.

Figure 4:
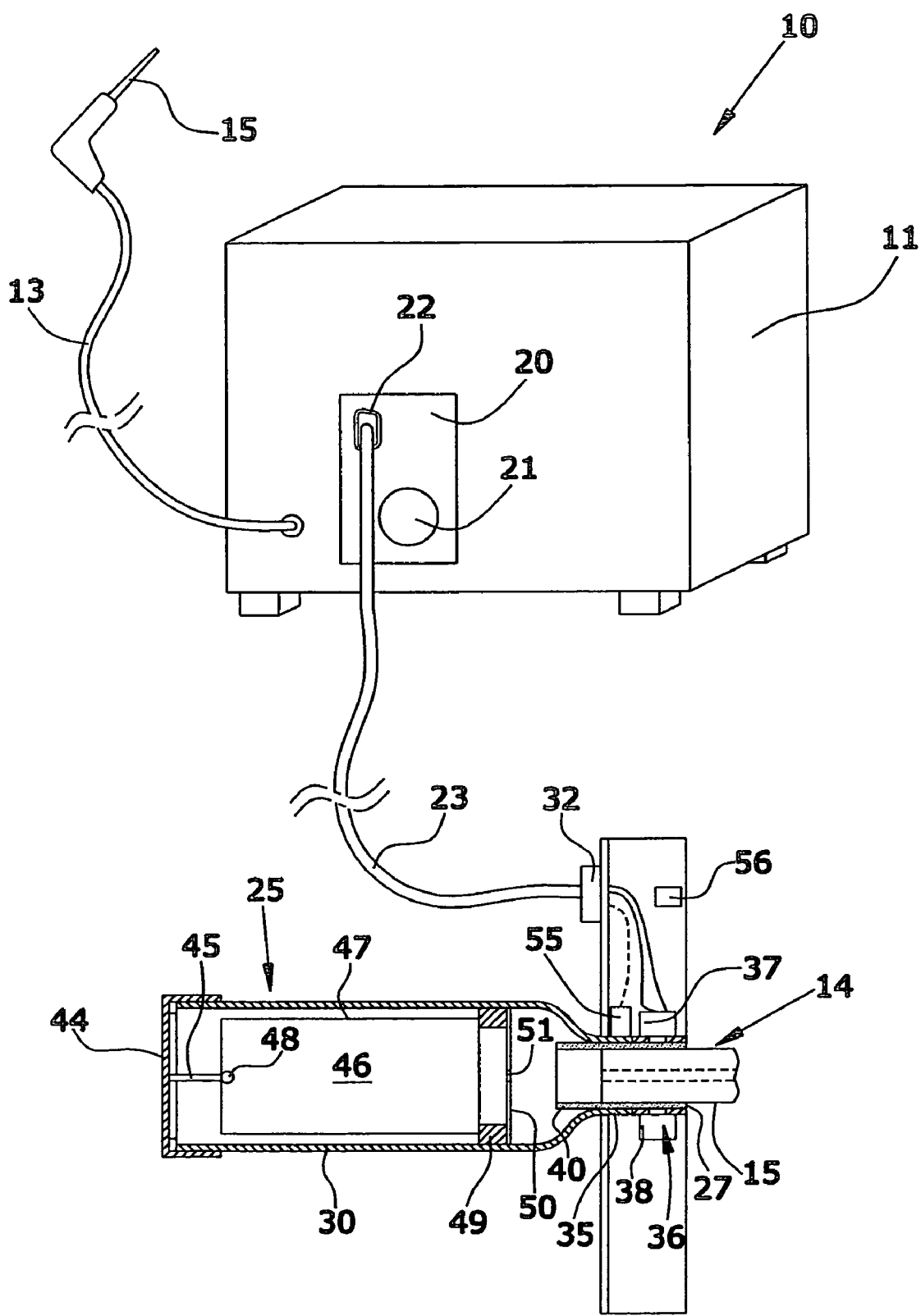

FIG. 4 illustrates the base appliance 10 and the test leak device 25, wherein the test leak device is drawn to a larger scale for a clearer illustration of the inner structure.

The sub-housing 24 comprises the plug-in channel 27 for the sniffer tip 15 of the sniffer probe 14. The plug-in channel is surrounded by a tubular wall 35 connected with the cartridge 30 in a pressure-tight manner. A radiation barrier 36 is provided at the plug-in channel, which is formed by a radiation emitter 37 and a radiation receiver 38 arranged on the opposite side. For example, the radiation barrier is a light barrier using visible light. For the light to pas, openings are provided in the side wall of the wall 35 surrounding the plug-in channel.

A tube 40 of transparent material, e.g. quartz glass or plastic material, is set tightly into the annular wall 35. On the one hand, the tube 40 serves to protect the radiation barrier 36 against contamination and also serves to prevent test gas from escaping both into the environment and into the inside of the sub-housing 24.

The cartridge 30 is cantilevered rearward from the sub-housing 24. It has a detachable bottom 44 which may be screwed thereto, for example, and it is pressure-tight. A thorn 45 projects from the bottom 44 into the cartridge. The cartridge contains the test gas supply 46 held in an exchangeable rest gas vessel 47. The thorn 45 opens a check valve 48 in the bottom of the test gas vessel 47 so that test gas flows into the cartridge, while the cartridge 30 is closed. The front end of the test gas vessel 47 is supported at a flange 49 inside the cartridge. This flange carries a membrane 50 which includes the test leak 51 in the form of a defined opening.

A thermal sensor 55 is arranged in the sub-housing 24 and in thermal contact with the cartridge 30 of thermally conductive material. Further, the sub-housing has a data memory 56 in the form of an EEPROM, as well as a processor 57 which is in data communication with the temperature sensor 55 and the data memory 56 and which further is in data communication with the control device in the base appliance 10 via the data cable 23.

Besides other functions, the processor 57 in the sub-housing 24 modulates the light barrier 36. The modulation causes a variation of the light intensity in time. In the simplest case, the light emitter 37 is turned on and off. In the light receiver, the modulated light and the light from other light sources, which are not switched on and off following the modulation cycle, superpose each other. Since the other light sources are not modulated with the correct frequency and phasing, the light from the light emitter 37 can be detected and evaluated selectively. This measure drastically increases the operational reliability of the light barrier. This modulation is useful even when the light intensity is reduced, e.g. by contamination, since the modulation signal can be differentiated from constant or consistent signals. Both the control of the light emitter and the evaluation of the light receiver signal is effected through the microprocessor 57.

Figure 5:
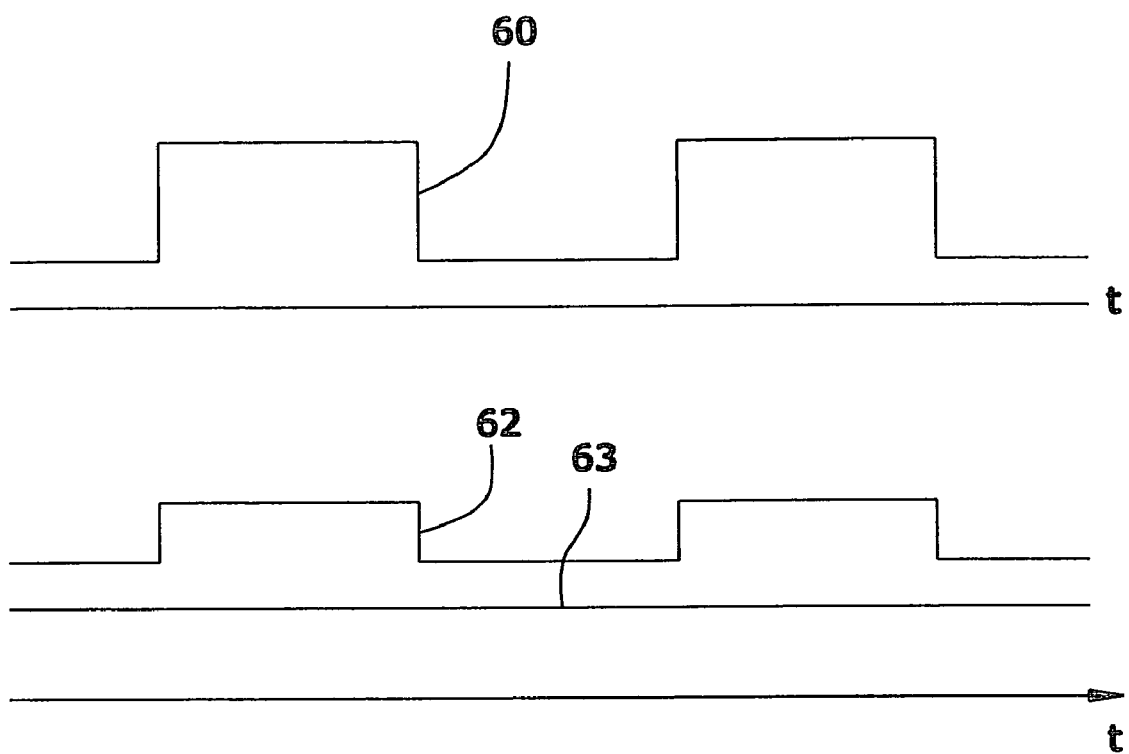
FIG. 5 illustrates the temporal developments of the light emitted by the light emitter and of a signal generated at the light receiver.

Plotted over the time axis t, FIG. 5 illustrates the temporal development of the signal 60 of the modulated light emitted from the light emitter, as well as the signal 62 generated at the light receiver. The signals 60 and 62 are pulses. In the light receiver, the signal 62 is superposed by an interference light signal 63. The pulsing by the signal 60 allows for selection of the received light from the signal 62 so that the condition of the channel monitored by the light barrier 36 is clearly discernible even under unfavourable conditions.

The processor 57 also processes the signals of the temperature sensor 55. It holds the characteristic of the temperature sensor. In good approximation, the characteristic of a temperature sensor may be assumed as linear, with the zero point and the slope resulting in a linear equation. If $K_N$ is the slope of the straight line of an item and $N_N$ represents the zero point error of the straight line of the item, then $$T_N = N_N + T_{TAT} \times K_N,$$

where $T_N$ is the measured temperature and $T_{TAT}$ is the actual temperature. Storing the factors and calculating the formula are effected in the processor 57. Further, the processor may filter variations in the measured temperature, caused by measuring inaccuracies, by a low pass computer-aided by the processor. The temperature output may be determined according to the following equation:

$$T_A = 0.99 \times T_F + 0.01 \times T_N.$$

Here, $T_A$ is the output temperature and $T_f$ is the previous temperature. $T_N$ is the measured temperature. By this temperature correction, the output temperature $T_A$ will level off at the mean value of the newly detected values $T_N$. In the next run of the calculation, the value of the output temperature calculated during the previous run becomes the previous temperature. Temperature measurement is important, since the leakage rate responds in dependence on the temperature. It is also possible to realize a compensation of this interference effect in the processor by using approximate formulae depending on the type of gas.

The erasable data memory 56 in the sub-housing 24 is an EEPROM that holds, among other information, the production date, the filling volume and information about the test gas. This information are stored in the data memory either automatically by reading a data carrier attached to the test gas vessel 47 or by manual input.

With gases having a constantly decreasing pressure in the vessel, such as helium, the present leakage rate can be determined more accurately knowing the filling date and the temperature. For a chosen unit time, such as a week, the still existing leakage rate is multiplied by a respective constant factor for a given leak. Since this factor is just below 1 for real leaks, a somewhat lower leakage rate is obtained for each week. Another possibility is in the use of an approximate function. Here, for example, a linear decrease of the leakage rate over time is presumed, which yields acceptable errors for short periods. When the test leak becomes too old, it has to be replaced.

To encrypt the data read into the data memory 56, a code not intelligible to a user may be provided, including all relevant data, as well as a checksum of the data transmitted.

An example for such a code is as follows:

Date: 25/02/06, for each figure x a value y is inputted, calculated according to the formula y=9−x. The result is: (9−2)=7 etc. The stored sequence of figures then reads: 749793.

The associated checksum could be an addition of all digits, where only the units digit is used. In the example above, the checksum will be: 7+4+9+7+9+3=39. Only the units digit 9 will be stored as the checksum.

The data stored may be decoded in the processor 57 or by the control device in the base appliance 10.

The invention claimed is:

1. A leak detector with a base appliance comprising a vacuum pump, a test gas detector and a control device, a sniffer probe connected with a housing of the base appliance through a hose, and a sub-housing with a test leak device which, in a controlled manner, discharges a test gas supply into a plug-in channel for the sniffer probe, wherein the sub-housing includes a processor that processes at least one parameter of the test leak device and is in data communication with the control device provided in the housing of the base appliance, and wherein the plug-in channel comprises:
  a tube made of a material permeable to radiation and sealed from the outside against the environment of the test gas supply; and
  a radiation barrier with a radiation emitter and a radiation receiver, which are arranged on different sides of the plug-in channel, wherein said radiation barrier operates in a modulation mode, and wherein the processor evaluates the signal from the radiation receiver using a modulation signal, so that influences caused by interfering light and contamination are eliminated.

2. The leak detector of claim 1, wherein the processor is configured or programmed such that it processes the filling date of the test gas vessel and the temperature as parameters and determines therefrom the actual leakage rate.

3. The leak detector of claim 1, wherein the processor is configured or programmed such that it processes the filling date of the test gas vessel and the initial leakage rate as parameters and determines therefrom the actual leakage rate.

4. The leak detector of claim 1, wherein the sub-housing comprises an erasable data memory, in which, among other information, the manufacturing date, the filling volume and/or the leakage rate may be stored.

5. The leak detector of claim 1, wherein the plug-in channel comprises a tube sealed from the outside against the environment of the test gas supply.

6. The leak detector of claim 1, wherein the radiation barrier is a light barrier, and wherein the tube is transparent.

7. The leak detector of claim 1, wherein the sub-housing is removably accommodated in a receptacle of the housing of the base appliance, open to the outside, the test leak device being functional both in the removed state and in the inserted state.

8. The leak detector of claim 1, wherein the sub-housing may optionally be connected with the housing of the base appliance via a data cable or a wireless plug-in connection.

9. The leak detector of claim 1, wherein a cartridge is fastened to the sub-housing for receiving a test gas vessel.

10. The leak detector of claim 9, wherein the cartridge projects from a rear wall of the sub-housing and the base appliance has a tunnel for receiving the cartridge.

11. The leak detector of claim 1, wherein the sub-housing comprises a temperature sensor for determining a temperature value of the test gas supply, this temperature value being supplied to the processor as a parameter.

12. The leak detector of claim 11, wherein the processor is configured or programmed such that it calculates the actual temperature with consideration to the slope of the straight line of temperature of the respective temperature sensor and a zero point error of the straight line of temperature.

13. The leak detector of claim 11, wherein the processor is configured or programmed such that it uses a low pass to filter variations in the measured temperature caused by measurement inaccuracies.

* * * * *